United States Patent [19]

Turoff et al.

[11] Patent Number: 4,655,355
[45] Date of Patent: Apr. 7, 1987

[54] CONTAINER INCLUDING INNER CLOSURE WITH OPENING PERMITTING FREE LIQUID FLOW

[75] Inventors: Robert Turoff, Buffalo Grove, Ill.; Cem M. Gokcen, Brundall, England; Brian Zdeb, Round Lake Park, Ill.

[73] Assignee: Baxter Travenol Laboratories, Inc., Deerfield, Ill.

[21] Appl. No.: 685,815

[22] Filed: Dec. 24, 1984

[51] Int. Cl.⁴ .............................................. B65D 1/02
[52] U.S. Cl. ................................................... 215/32
[58] Field of Search .................................. 215/32, 33

[56] References Cited

U.S. PATENT DOCUMENTS

| | | | |
|---|---|---|---|
| 225,752 | 3/1880 | Griswold et al. | 215/271 |
| 2,582,489 | 1/1952 | Krueger | 215/270 X |
| 3,059,798 | 10/1962 | Darmstadt et al. | 215/13 |
| 3,246,783 | 4/1966 | Muhlhoff | 215/251 |
| 3,597,793 | 8/1971 | Weiler et al. | |
| 3,851,029 | 11/1974 | Cornett et al. | 264/89 |
| 3,902,619 | 9/1975 | Gouget | 215/33 |
| 3,919,374 | 11/1975 | Komendowski | 53/140 |
| 3,979,004 | 9/1976 | Bertario | 215/341 |
| 3,994,412 | 11/1976 | Difiglio | 220/266 |
| 4,019,646 | 4/1977 | Imamura | 215/329 |
| 4,093,093 | 6/1978 | Fowles et al. | 215/251 |
| 4,174,784 | 11/1979 | Hartung | 215/271 |
| 4,176,755 | 12/1979 | Winchell | 215/32 |
| 4,226,334 | 10/1980 | Weiler et al. | 215/355 |
| 4,228,910 | 10/1980 | Barre | 215/364 |
| 4,319,701 | 3/1982 | Cambio | 222/541 |
| 4,378,891 | 4/1983 | Fowles et al. | 215/32 |
| 4,402,415 | 9/1983 | Hopley | 215/32 |
| 4,405,053 | 9/1983 | Cherot | 215/32 |
| 4,478,342 | 10/1984 | Slater et al. | 215/32 |
| 4,526,279 | 7/1985 | Weiler et al. | 215/32 |

FOREIGN PATENT DOCUMENTS 60487 11/1954 France .
2105250 3/1983 United Kingdom .

Primary Examiner—Donald F. Norton
Attorney, Agent, or Firm—Paul C. Flattery; John P. Kirby; Brad R. L. Price

[57] ABSTRACT

A container (10) having a line of weakness (18) at which the container is opened includes an inner closure (20) mounted within the container cover (16) above the line of weakness (18), and an annular sidewall (22) depending below the frangible line of weakness (18). The inner closure (22) protects the line of weakness (18) from the liquid contents, thereby preventing spillage of liquid contents onto outer non-sterile surfaces upon opening of the container. The container prevents the commercially undesireable retention of moisture in the volume (40) defined by the cover (16) and the inner closure (20). The container may be integrity tested using standard testing procedures.

3 Claims, 5 Drawing Figures

CONTAINER INCLUDING INNER CLOSURE WITH OPENING PERMITTING FREE LIQUID FLOW

U.S. Pat. No. 4,478,342, entitled "Sterilizable Container With Inner Closure and Collapse-Resistant Cover", Glenn L. Slater et al., is incorporated by reference herein.

TECHNICAL FIELD OF THE INVENTION

The present invention relates to plastic containers having body, neck and cover portions of one-piece construction, wherein a frangible line of weakness is disposed between the cover and the neck to permit opening of the containers. The invention is particularly directed to a container having a separate inner closure to isolate the container contents from the frangible line of weakness and further to a heat sterilized container for medical fluids.

BACKGROUND OF THE INVENTION

Plastic containers having one-piece, integral construction, including the cover, are known. Typically, an area of reduced wall thickness is made between the cover and the container neck. The cover is removed by rotating a threaded neck ring which exerts an axial force, either in compression or tension, on the cover and fractures the area of reduced wall thickness.

Although containers of this type have found application in the medical industry, e.g., for storing and dispensing sterile liquids, on occasion a minute amount of liquid sometimes spills onto the outer surface of the container during opening. This is the result of small amounts of the liquid accumulating in the area of reduced wall thickness. This may occur, for example, during shipping or handling, via splashing or sloshing, or tilting of the container. When this area is fractured during opening, the liquid may escape onto the exterior surface of the container, typically onto the neck threads. Although the medical significance of such small amounts of liquid on the container threads is subject to debate, it is generally recognized as being commercially undesirable.

This problem has been solved by the invention disclosed in above-identified U.S. Pat. No. 4,478,342, incorporated by reference herein. As shown in that patent, the container includes body, neck and cover portions of a one-piece plastic construction. The line of weakness is defined between the neck and cover portions to permit selective separation of the cover portion from the neck portion. A separately formed inner closure member is provided in the container, which inner closure is carried by the cover and isolates the container contents below the frangible line of weakness. The inner closure serves as a liquid seal of the container contents from the line of weakness so that when the container is opened by breaking the frangible line of weakness, the inner closure is removed with the cover and liquid will not escape onto the exterior surface of the container.

The nesting engagement between the inner closure and the neck portion provides a liquid-tight seal between the inner closure and the neck while permitting easy withdrawal of the inner closure with removal of the cover. Where circumstances permit, e.g., where sterility of the contents is not required, the nesting arrangement also permits resealing of the container in the event all of the contents are not used.

In medical applications, the contents of the container shown in U.S. Pat. No. 4,478,342 is typically sterilized by the application of heat sufficient to destroy germs and microbes which would otherwise make the container contents medically unacceptable. After heat sterilization, the exterior of the container is typically splashed with water such as from shower-type spraying nozzles. This drastically reduces the cooling time of the containers, which therefore also drastically reduces the time for the plastic, perhaps as hot as 250° F. upon heating, to set, and enables earlier handling by equipment or people at a subsequent work station. Thus, the decreased cooling cycle time caused by the water spray greatly increases the speed by which the containers may be manufactured, thereby improving efficiency.

Heat sterilization presented a new problem with this improved container with the cover-removable closure. During the cooling step, it was found in some instances that the cover of the container had a tendency to collapse. Such collapse is highly undesirable for a number of reasons. The collapse of the cover may make subsequent installation and operation of the threaded neck ring on the cover impossible. The collapse of the cover may create additional stress on the preformed line of weakness sufficient to destroy the effectiveness of the container as a sterile barrier to the container contents at the line of weakness. The added stress may be sufficient to actually break the line of weakness. Additionally, the collapsed cover has a misshapen appearance which makes the container commercially unacceptable.

The problem of cover collapse in the container has been solved in U.S. Pat. No. 4,478,342 by providing moist air in the chamber defined between the cover portion and the inner closure, while still preventing moisture in the defined chamber from dripping out of the defined chamber onto the exterior surface of the container upon the opening thereof.

In one embodiment shown in that patent, the defined chamber is closed to chamber-external moisture. A small volume of liquid is carried in the defined chamber, segregated from the defined volume. The liquid is dispensed into the inner closure before the formation of the cover and the chamber defined by both the cover and the inner closure.

In another version, the defined chamber is not closed. Instead, a vent is provided. The vent is disposed between the chamber and the defined volume of the container and includes an opening in the inner closure in communication with the defined volume of the container. The opening is small enough to prevent moisture in the defined chamber from dripping therethrough.

When the first alternative is chosen, i.e., when the defined chamber is closed to chamber-external moisture, including the contents of the container below the inner closure, a small volume of liquid must be added to the defined chamber in a separate operation. Typically, this is performed by placing a drop of liquid in the inner closure before the inner closure is inserted into the blow mold. This necessitates use of machinery for providing a separate source of clean, if not sterile, liquid; providing means for metering the liquid into the inner closure before the blow molding operation; and ensuring that none of the liquid placed in the inner closures spills out of the inner closure, into the parison below the to-be-formed frangible line of weakness for example, thereby mixing with the container contents. Also, the bottom surface of the inner closure is typically tapered so that liquid will not adhere to the outside thereof. With the bottom tapered surface, the inner closure does not sit squarely on a flat surface. This aggravates the problem of ensuring that liquid placed in the inner closure stays within the inner closure during tranfer of the inner closure to the blow mold.

The second alternative, i.e., providing a vent opening in the inner closure, does not require the addition of liquid into the inner closure before blow molding. The vent opening allows moist air to enter the defined chamber from the container contents below the frangible line of weakness during heat sterilization. The opening is designed to be small enough to prevent moisture which has entered the defined chamber during sterilization from exiting the defined chamber through the vent opening. As disclosed in U.S. Pat. No. 4,478,342, moisture could otherwise exit the defined chamber during opening of the container, thereby possibly dripping onto the non-sterile, external container threads, which would thereby defeat one of the principal purposes of the inner closure.

Typically the container, including the cover portion thereof, is made of an optically translucent or transparent plastic so as to allow for visual inspection of the container contents. Such a construction also permits viewing of the moisture trapped in the defined chamber during sterilization because of the vent opening however and it has been found that such an arrangement may be commercially undesirable, raising questions in the minds of medical personnel as to the reasons for the moisture in the upper defined chamber, even though the moisture trapped through the vent opening is sterile and is the same liquid as the container contents. Moisture is also visible in the defined chamber with the earlier described alternative in which moisture is added into the closure in a separate operation.

Such containers also are difficult to test for improperly made containers using standard test procedures. It is desirable to test the integrity of the frangible line of weakness during the manufacturing operation so as to reject those containers which leak at the line of weakness. With either embodiment shown in U.S. Pat. No. 4,478,342, additional moisture from the container contents cannot be forced into the defined chamber or adjacent the line of weakness under pressure and thus it is difficult to check for improperly made containers.

SUMMARY OF THE INVENTION

The present invention solves the above problems by providing a container which does not permit liquid to accumulate in the area of reduced wall thickness and thus does not permit liquid to escape onto the exterior surface of the container during opening. The present invention provides a container having a cover portion which does not collapse during or after sterilization, yet which eliminates the need for providing liquid in the inner closure in a separate operation and which eliminates the accumulation of moisture in the cover portion because of a vent opening.

The container of the present invention includes body, neck and cover portions of one-piece plastic construction. The line of weakness is defined between the neck and cover portions to permit selective separation of the cover portion from the neck portion. A unique, separately formed inner closure member is provided in the one-piece container, which inner closure is carried by the cover and isolates the container contents below the frangible line of weakness. The inner closure serves as a liquid seal of the container contents from the line of weakness to prevent the container contents from entering the area of the line of weakness during shipping, storing and handling of the container. The inner closure includes a tapered annular side wall for engaging against an annular seat on the neck portion. The side wall is free of, or virtually free of, any inwardly projecting bottom wall or lip depending therefrom, so as not to trap any liquid within the inner closure or the volume defined by the cover portion and the inner closure.

Moisture in the container contents will provide for moist air within the defined volume during heat sterilization and also subsequent cooling, thereby preventing collapse of the cover portion. Because there is no bottom wall, or virtually no bottom wall whatsoever, moisture which is in the defined volume during sterilization, or even during shipping, storing and handling, exits the defined volume prior to opening of the container.

The inner closure, without the bottom wall, permits checking for leaks of the container frangible area consistent with known standard procedures and may be manufactured with greater dimensional variation than the inner closure shown in U.S. Pat. No. 4,478,342. The container of the present invention permits integrity testing of the frangible line of weakness because the liquid contents may be forced under pressure into the defined volume. Liquid will thus exit the container through any faulty frangible line of weakness, enabling the container to be rejected during the manufacturing operation.

Furthermore, the inner closure of the container of the present invention has a rim including a cylindrical wall portion received within a groove in the cover portion. The rim portion includes a relatively large, thin outer ring having an upper surface which tapers upwardly as it extends outwardly from the rim, thereby providing a positive interlock with the cover portion and providing a torturous leakage path to prevent liquid from escaping between the cover portion and the inner closure, from either above or below the frangible line of weakness.

DETAILED DESCRIPTION OF AN EXAMPLE EMBODYING THE BEST MODE OF THE INVENTION

Figure 1:
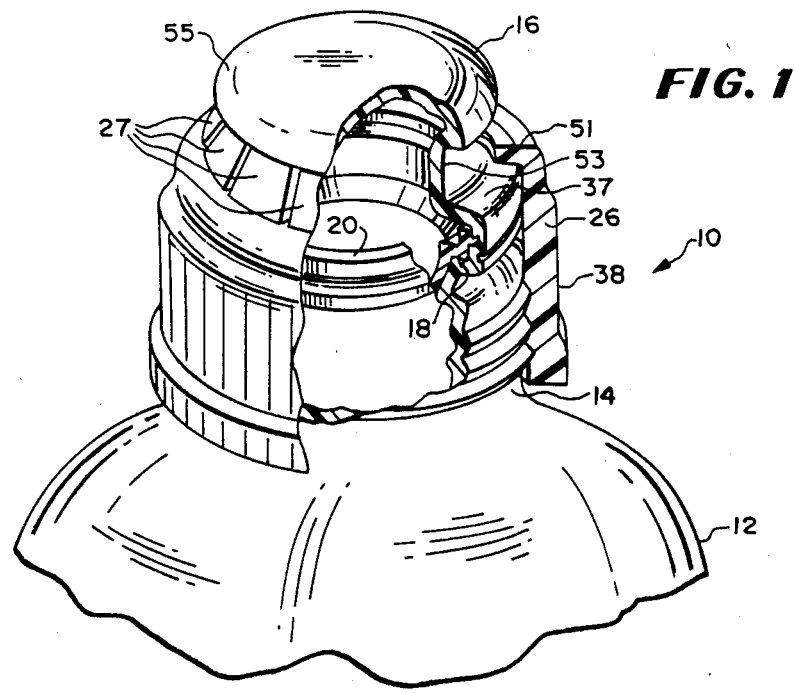
FIG. 1 is a perspective view of a container according to the present invention, with portions of the removal ring, cover portion, inner closure and neck broken away to illustrate the features thereof, including the defined volume.
Figure 2:
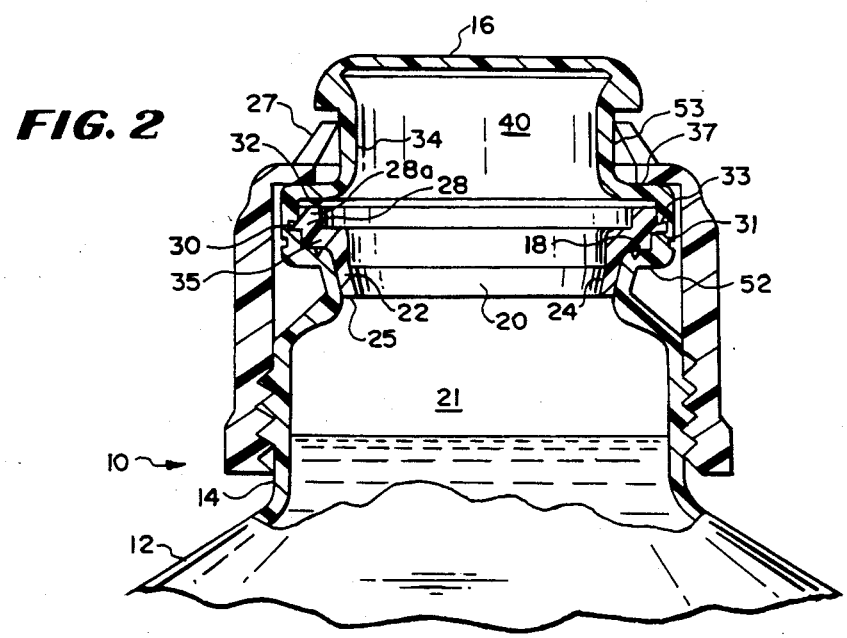
FIG. 2 is a vertical, sectional view of the neck and closure portion of the container of FIG. 1.
Figure 3:
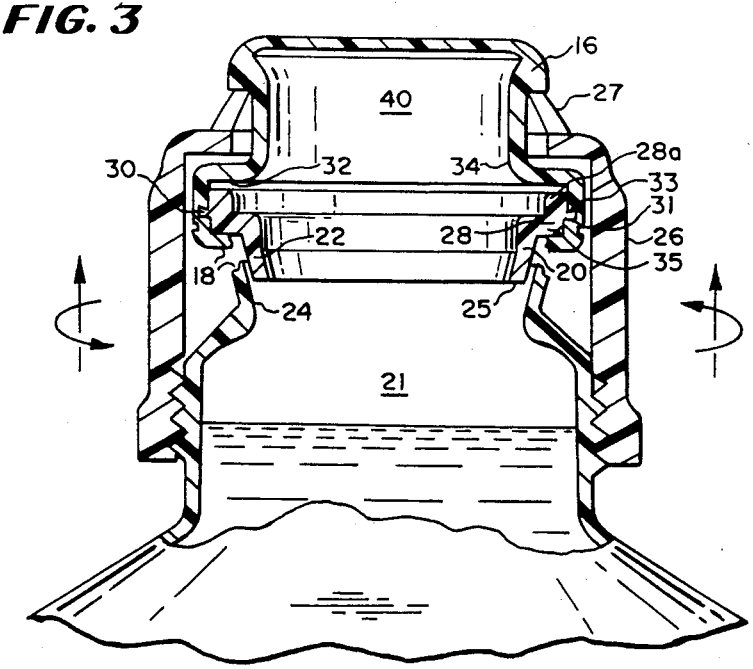
FIG. 3 is a vertical, sectional view of the neck and closure portion of the container, illustrating the removal of the container cover and the inner closure by rotation of the outer removal ring.

Referring to FIGS. 1 through 3, the present invention is generally embodied in a one-piece, hermetically sealed plastic container 10 of the type having a body portion 12, a neck portion 14 and an outer cover or closure portion 16, which is separated from the neck portion by a line of weakness, such as a line of reduced wall thickness 18. The container contents are stored in the area below the line of weakness 18, in the defined contents volume 21. An inner closure 20 is carried by the cover portion 16 of the container and is disposed to seal the neck of the container at a position below the line of weakness 18. In the preferred embodiment, the inner closure 20 preferably has a tapered side wall 22 which nestingly engages against a tapered wall portion 24 of the neck, below the line of weakness. The nesting engagement provides a water tight seal against the passage of liquid beyond the inner closure, into the area of the line of weakness 18, but permits quick removal of the inner closure with the cover. The outer cover 16 may be removed by a threaded removal or jacking ring 26 which is threadedly received on the neck portion 14 of the container and which, upon rotation, exerts an upward axial force on the cover, causing fracturing at the line of reduced wall thickness 18, as seen in FIG. 3.

More particularly, in the preferred embodiment of the invention the container 10 is made of a thermoplastic material, such as polyethylene or polypropylene, suitable for blowmolding in the desired shape of the container body, e.g., round or rectangular. The container body narrows at its upper end to form the neck portion 14, which is externally threaded to receive the jacking ring 26. The upper end of the neck wall slants or tapers inwardly and then outwardly, forming the inside tapered surface 24 against which the inner closure 20 seats. The angle of taper on the neck wall portion preferably matches the angle of taper of the side wall 22 of the inner closure member for a liquid-tight surface-to-surface seal. The upper cover 16 is joined to the neck portion along an annular shoulder 52, within which the continuous line of reduced wall thickness 18 is provided.

The cover portion 16 of the container extends upwardly from the annular shoulder 52. The wall of the cover forms an annular indented channel 53 and terminates in a top wall 55.

The inner closure 20 has a ring-like structure and includes an upper, radially extending, circular, annular rim 35 and the inwardly tapered annular side wall 22, the sidewall having a lower edge 25. The sidewall, including the lower edge, is free of an inwardly projecting bottom wall or lip depending therefrom. The sidewall 22 extends upwardly and outwardly from the lower edge 25 thereof at an angle preferably less than forty-five degrees from vertical. The upper rim 35 includes a cylindrical wall portion 28 of larger diameter than the upper edge of the tapered side wall 22. An interlocking ring 30 projects outwardly from the cylindrical wall portion 28 and includes bottom and top ring surfaces 31, 33 respectively. The top ring surface 33 tapers upwardly as it extends outwardly from the wall portion 28 of the rim 35. The upper rim 35, including the interlocking ring 30, is received within a groove 32 in the interior surface 34 of the cover portion 16, so that when the cover portion 16 is lifted by the threaded removal ring 26, the inner closure 20 is lifted with it. To provide a liquid-tight seal therebetween, the inner closure 20 is tightly engaged against the tapered surface 24 of the neck portion 14. The wedging or nesting action provided by the cooperative taper of the inner closure side wall 22 and the tapered surface 24 of the neck 65 provides a liquid-tight seal to seal the neck portion 14 below the line of weakness, isolating the container contents from the line of weakness 18, even under various temperature and humidity conditions which the container may experience, while still permitting easy withdrawal of the inner closure from the neck simultaneously with removal of the container cover portion 16. The outer ring 30 assists in forming a mechanical interlock between the rim 35 and the cover 16. The upper portion 28a of the wall 28, above the ring 30, has a larger outer diameter than the remainder of the wall 28, for a stronger seal between the insert 20 and the cover 16, as will be explained below.

The inner closure is preferably made of a rigid plastic material, such as polyethylene or polypropylene, suitable for injection molding or for other plastic forming operations. It is also preferred that the inner closure be made of a material different from that of the container neck portion, to insure that there is no unintentional bonding between the closure and the container neck during heat sterilization, storage or the like.

To achieve withdrawal of the inner closure 20 at the same time the container cover 16 is removed, the rim 35 of the inner closure is secured to the side wall of the cover. In the preferred embodiment, the cylindrical wall portion 28 of the rim 35 is captured tightly within the groove 32 of the container cover 16. The interlocking ring 30 assures that the rim 35 will stay trapped within the groove. Additionally, the cylindrical wall portion 28 may extend fully between the outwardly extending annular shoulder 52 and the upper horizontal return portion 37, which form the groove 32, although this is not necessary. By making a shorter wall 28, which does not abut the return portion 37, more vertical tolerance is provided in the molding operation of the cover about the inner closure 20.

Although other techniques may be available for removing the cover (e.g., bending the cover to break the frangible connection), in the preferred embodiment a removal or jacking ring 26 is provided for a twist-off removal of the closure including the cover 16 and the inner closure 20. The jacking ring 26 is of rigid plastic construction also, and has a generally cylindrical side wall 38, with a plurality of upwardly and inwardly extending fingers 27 along the upper edge of the side wall. The fingers 27 are sufficiently flexible to permit attachment of the jacking ring to the container. When the jacking ring is rotated upwardly in the opposite direction, the ends of the fingers engage the upper edge of the indented channel 53 in the cover and exert an upward axial force thereon. As illustrated in FIG. 3, with a moderate twisting force applied to the ring 26, sufficient upward axial force may be generated to cause fracture along the line of reduced wall thickness 18, resulting in a lifting of the cover 16 as well as the inner closure 20 which is carried by the cover 16.

Because there is no bottom wall to the insert and because of the steep slope of the tapered side wall 22 it has been found that there is virtually no moisture remaining in the cover volume 40 defined by the cover 16 and insert 20. Moisture which enters the defined cover volume 40 during sterilization, shipping, storing and handling falls out of the cover volume 40 into the contents volume 21. Because of surface tension, a very small amount of moisture may adhere to the surfaces of the defined cover volume 40, but this adhered moisture does not even fall out of the cover volume 40 during removal of the cover 16 and inner closure 20, so that no moisture falls on the outer, non-sterile surfaces of the container.

Where circumstances permit, such as in non-medical applications where sterility of the contents is unimportant, the present construction also permits resealing of the container. After removal, the cover 16 and inner closure 20 remain captured by the fingers 27 of the removal ring 26. Upon reattachment of the removal ring 26 to the container neck, the internal shoulder 51 of the removal ring 26 engages and presses against the return wall portion 37 of the outer cover. When tightened, the removal ring forces the inner closure 20 into close resealing contact with the tapered surface 24 of the container neck, sealing any remaining contents within the container.

Figure 4:
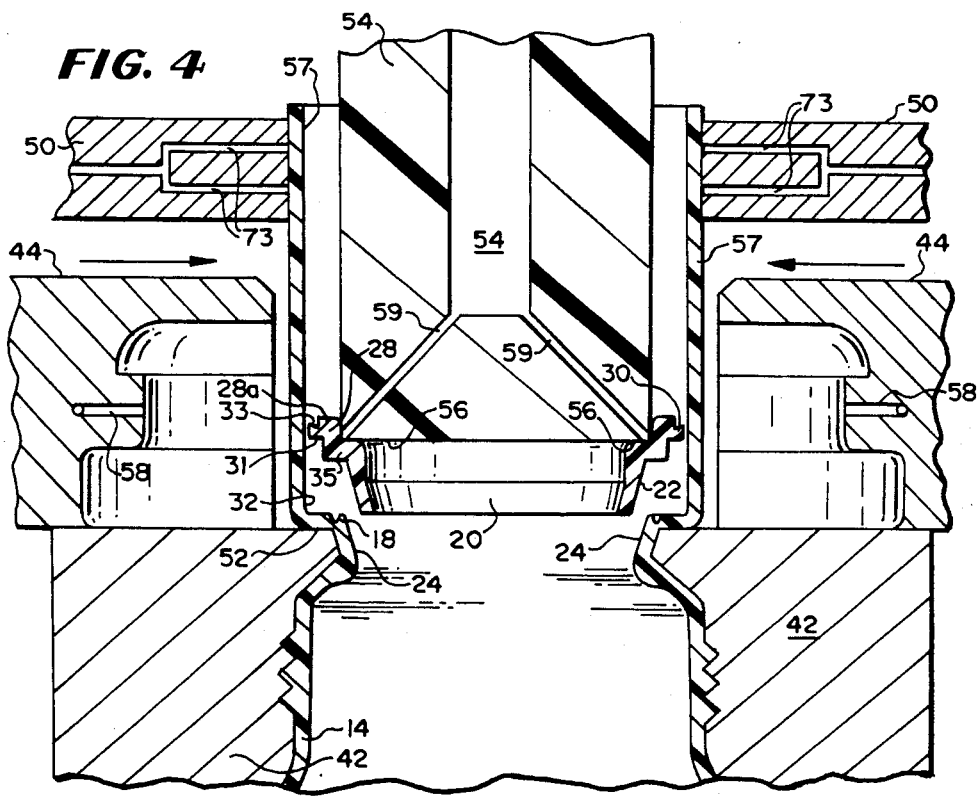
FIG. 4 is a vertical, sectional view of molding apparatus employed for making the container.
Figure 5:
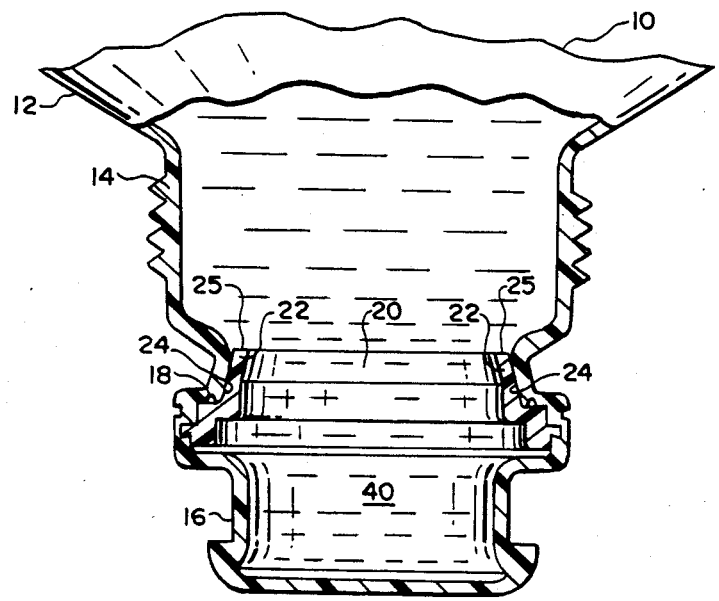
FIG. 5 is a vertical, sectional view of the neck and closure portion of the container during testing for integrity of the frangible line of weakness.

Referring now to FIGS. 4 and 5, there is shown the manufacture of the container of the invention.

FIG. 4 depicts molding apparatus and techniques which may be employed to make a container of the type described above. Molding apparatus for the present invention employs a pair of lower mold halves 42 for forming the body portion 12 and neck portion 14 of the container 10 and a pair of relatively movable upper mold halves 44 for forming the cover portion 16 of the container. As seen in FIG. 4, the container of the present invention is formed using the well known technique of blowmolding.

A molten plastic parison 57 is extruded between the lower and upper mold halves 42, 44, respectively. The upper end of the parison is held open by a pair of vacuum jaws 50 having jaw vacuum ports 73. After the lower mold halves 42 close about the parison, a mandrel (not shown) is inserted into the parison, and injects the contents under pressure thereinto, simultaneously filling the container and expanding the parison to conform to the body and neck mold surfaces of the lower mold halves 42. Simultaneously, an annular ring on the lower end of the mandrel forms the reduced wall thickness portion 18 in the annular shoulder 52 of the container by pressing against the upper surface of the mold halves 42. One technique and a mandrel for forming the reduced wall thickness is described in detail in U.S. Pat. No. 3,597,793. After formation of the container body and neck, the mandrel is withdrawn. A plunger 54 picks up an inner closure 20. The inner closure 20 is held on the end 56 of the plunger 54 by an applied vacuum through the plunger vacuum conduit 59. It has been found that an applied vacuum of 25 in. Hg works adequately.

The plunger 54, with the inner closure 20 attached thereto, is inserted between the mold halves 44. The plunger 54 presses the inner closure 20 downwardly, with the side wall 22 in tight contact with the tapered surface 24 of the neck portion 14. Once the inner closure 20 is seated, the vacuum is released. The plunger 54 is then withdrawn.

Next, the upper mold halves 44 are closed inwardly to form the cover portion 16 of the container 10. The upper mold halves 44 are dimensioned to form the outer cover 16 tightly about the rim 35 of the inner closure 20. It is believed that the cylindrical wall 28 of the inner closure 20, including the larger upper portion 28a, assists in forcing molten plastic into the area immediately adjacent the interlocking ring 30, including adjacent the top ring surface 33 which extends upwardly and outwardly. Such a construction forms a water-tight mechanical seal between the rim 35 and the cover 16, preventing moisture in the cover volume 40 from reaching the frangible line of weakness 18 between the wall portion 28 of the inner closure 20 and the groove 32 of the cover 16. In some instances the bond at the wall portion 28 and groove 32 may be a chemical bond, formed by the molten plastic upon formation of the cover portion 16, but this is not believed necessary. The upper mold halves 44 include vacuum ports 58, which upon activation draw the parison into close forming contact to the surface of the upper mold halves 44. The formed container 10 is then released from the molds, and the threaded removal ring 26 is subsequently added over the cover 16 and neck 14.

The container contents may be terminally sterilized, i.e., sterilized after the container is formed and filled, sufficiently to destroy microbes or other agents which would otherwise make the contents medically unacceptable. In the preferred embodiment, as an example only, a one liter size container may be heated to 240° F. for a period of about 36 minutes. During this heating step, some of the container contents in the defined contents volume 21 of the container will be transformed into steam within the body portion 12, and some steam will enter the cover volume 40. However, the seal between the upper, circular rim 35, including the cylindrical wall portion 28 and ring 30 thereof, and the groove 32 and interior surface 34 of the cover portion 16 is good enough to prevent any significant amount of moisture from reaching the line of weakness 18 from above the inner closure 20. Moisture is prevented from entering the line of weakness 18 from below by the seal between the inner closure side wall 22 and the tapered surface 24 of the neck portion 14.

After heat sterilization, the container 10 and the contents are of course quite hot. At this heated temperature, the plastic is somewhat soft and installation of the threaded removal ring 26 is impaired. The removal ring 26 is therefore added only after cooling of the container. Additionally, the container 10 is too hot to be handled by human hands for either installation of the removal ring 26 or for transfer to another work station.

To allow for a faster manufacturing process, the containers are cooled more quickly by spraying them with water from a spray nozzle. The problem of cover collapse during cooling discussed and solved in U.S. Pat. No. 4,478,342 is not presented by the container 10 of the present invention because of the inner closure design, which permits moisture to freely enter the cover volume 40 during sterilization, so that the internal pressure of the moist air in the cover volume 40 is the same as the moist air in the contents volume 21 during cooling.

Like the containers provided by the invention of U.S. Pat. No. 4,478,342, the container 10 of the present invention prevents any significant moisture from remaining in the defined volume 40 which would otherwise be commercially undesirable.

The container 10 of the present invention also solves the problem of integrity testing. The weakest part of the container 10 is the frangible line of weakness 18. Because of the sterility issues associated with medical products, it is important that the frangible line of weakness 18 remains intact until the container is opened. It is therefore desirable to be able to test the product to ensure that the frangible line of weakness effectively seals the container 10.

A known integrity test for containers of one-piece construction having a frangible line of weakness 18 is to pressurize the liquid contents so that some of the liquid will exit the container through any opening in a defective frangible line of weakness 18. To do this, the container is inverted. To pressurize the inside of the container, the container is either simply squeezed or the container is placed in a vacuum chamber and a vacuum is drawn, which has the same effect as simply squeezing the container. The containers are then checked for moisture on the outside of the containers, particularly around the frangible line of weakness 18. If any moisture is found, the container is rejected.

Although the containers described in U.S. Pat. No. 4,478,342 are functionally superior to prior art containers for the reasons described in that patent, such containers are hard to test using the test procedure described above, because even when such containers are inverted and even when the inner closure includes a vent opening, liquid under pressure cannot be forced into the area adjacent the line of weakness 18.

In contrast, and as illustrated in FIG. 5, integrity testing for the frangible line of weakness 18 of the container 10 may be easily performed utilizing the above-described procedure. The liquid container contents fill the defined cover volume 40 and the neck portion 14 of the container 10. As the container body portion 12 is squeezed, or alternatively as a vacuum is drawn, moisture will exit the container at any opening, which indicates a defective container. During pressure testing the liquid contents can reach the line of weakness 18, the liquid being forced between the neck portion 14 and the sidewall 22, thereby providing a proper test of the line of weakness 18. It is believed that this occurs because the sidewall 22, with the open lower edge 25, flexes slightly away from the tapered surface 24 of the neck portion 14. When pressure ceases, the sidewall 22 once more tightly adheres to the tapered surface 24.

The container 10 of the invention protects the line of weakness 18 from moisture, thereby preventing spillage of liquid contents onto non-sterile surfaces. The container prevents the commercially undesireable retention of moisture in the defined volume 40. The container may be integrity tested using standard testing procedures.

Although the present invention has been described in terms of the preferred embodiments, as defined in the appended claims, it is intended to include a equivalent structures, some of which may be immediately apparent upon reading this description, and others which may become apparent only after some study.

What is claimed is:

1. A plastic container comprising:
   (a) a body portion;
   (b) a neck portion extending from said body portion;
   (c) a cover portion closing the neck portion and being of a one-piece construction with said neck portion;
   (d) a frangible line of weakness defined between said neck and cover portions to permit selective separation of said cover portion from said neck portion;
   (e) a separately formed inner closure mounted in said container and covering said frangile line of weakness, said inner closure including
      (i) an annular side wall liquid-sealingly engaged against the surface of said neck portion below said frangible line of weakness,
      (ii) a rim portion mounted within said cover portion, from which said inner closure sidewall depends, said rim portion extending outwardly from said side wall, said rim portion including a cylindrical wall portion and an interlocking ring projecting outwardly from said cylindrical wall portion, said interlocking ring including a top ring surface which extends upwardly and outwardly from said wall portion and
      (iii) a lower edge of said side wall in said neck portion, said lower edge being virtually free of any inwardly projecting bottom wall depending therefrom, such that fluid may freely flow between the contents volume defined by said body and neck portions and said cover volume defined by said cover portion and said inner closure.

2. The container in accordance with claim 1, wherein said wall portion includes an upper portion above said interlocking ring having a larger outer diameter than the remainder of said wall portion.

3. The container in accordance with claim 1, wherein said separately formed inner closure is carried by and removable with said cover portion.

* * * * *